US012786086B2

(12) United States Patent
Kathare et al.

(10) Patent No.: US 12,786,086 B2
(45) Date of Patent: Nov. 3, 2026

(54) WIDE AREA NETWORK LINK BANDWIDTH MONITORING

(71) Applicant: Juniper Networks, Inc., Sunnyvale, CA (US)

(72) Inventors: Gorakhanath Kathare, Bangalore (IN); Jie C Jiang, San Jose, CA (US); Manoj Gupta, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 482 days.

(21) Appl. No.: 18/346,009

(22) Filed: Jun. 30, 2023

(65) Prior Publication Data

US 2025/0007803 A1 Jan. 2, 2025

(51) Int. Cl.

*H04L 43/0823* (2022.01)
*H04L 43/0876* (2022.01)
*H04L 47/83* (2022.01)

(52) U.S. Cl.

CPC ...... *H04L 43/0823* (2013.01); *H04L 43/0876* (2013.01); *H04L 47/83* (2022.05)

(58) Field of Classification Search

CPC ............. H04L 43/0823; H04L 43/0829; H04L 43/0876; H04L 41/0894; H04L 41/0654; H04L 41/16; H04L 41/147; H04L 41/122; H04L 47/83; H04L 41/0645; H04L 43/83; H04W 24/08
USPC .......................................................... 370/242
See application file for complete search history.

(56) References Cited

U.S. PATENT DOCUMENTS

| | | | |
|---|---|---|---|
| 9,729,439 B2 | 8/2017 | MeLampy et al. | |
| 9,729,682 B2 | 8/2017 | Kumar et al. | |
| 9,762,485 B2 | 9/2017 | Kaplan et al. | |
| 9,871,748 B2 | 1/2018 | Gosselin et al. | |
| 9,985,883 B2 | 5/2018 | MeLampy et al. | |
| 10,200,264 B2 | 2/2019 | Menon et al. | |
| 10,277,506 B2 | 4/2019 | Timmons et al. | |
| 10,432,522 B2 | 10/2019 | Kaplan et al. | |
| 10,756,983 B2 | 8/2020 | Ratkovic et al. | |
| 10,986,027 B1 * | 4/2021 | Sears | H04L 12/4641 |
| 10,992,543 B1 | 4/2021 | Rachamadugu et al. | |
| 11,165,863 B1 | 11/2021 | Timmons et al. | |
| 12,041,303 B1 * | 7/2024 | Brailovskiy | H04L 43/0829 |
| 2015/0332155 A1 | 11/2015 | Mermoud et al. | |
| 2017/0347063 A1 * | 11/2017 | Singh | H04N 7/148 |
| 2019/0081884 A1 * | 3/2019 | Spohn | H04L 45/125 |

(Continued)

OTHER PUBLICATIONS

U.S. Appl. No. 63/477,964, filed Dec. 30, 2022, naming inventors Wu et al.

(Continued)

*Primary Examiner* — Jungwon Chang
(74) *Attorney, Agent, or Firm* — Shumaker & Sieffert P.A.

(57) ABSTRACT

A network management system instructs a first network device to obtain one or more parameters related to a Wireless Area Network (WAN) link between the first network device and a second network device. The network management system executes a machine learning system configured to apply, to the one or more parameters related to the WAN link, a machine learning model trained with parameters of links to predict bandwidths of the links, to predict a maximum bandwidth of the WAN link. The network management system outputs an indication of the predicted maximum bandwidth of the WAN link.

20 Claims, 7 Drawing Sheets

(56) References Cited

U.S. PATENT DOCUMENTS

| | | | | |
|---|---|---|---|---|
| 2020/0092732 | A1* | 3/2020 | Raj | H04W 24/10 |
| 2020/0204452 | A1* | 6/2020 | Bhat | H04L 41/0645 |
| 2020/0366589 | A1 | 11/2020 | Kaplan et al. | |
| 2020/0366598 | A1 | 11/2020 | Kaplan et al. | |
| 2020/0366599 | A1 | 11/2020 | Kaplan et al. | |
| 2020/0403890 | A1 | 12/2020 | McCulley et al. | |
| 2023/0107735 | A1 | 4/2023 | Wang et al. | |
| 2023/0116881 | A1 | 4/2023 | Mehta et al. | |
| 2023/0231785 | A1* | 7/2023 | Kumar | H04L 41/122 709/224 |
| 2024/0163225 | A1* | 5/2024 | Narahari | H04L 45/76 |
| 2024/0179088 | A1* | 5/2024 | Dhamija | H04L 41/147 |

OTHER PUBLICATIONS

U.S. Appl. No. 63/501,786, filed May 12, 2023, naming inventors Wu et al.

Extended Search Report from counterpart European Application No. 23200622.1 dated Feb. 15, 2024, 10 pp.

Response to Extended Search Report dated Feb. 15, 2024, from counterpart European Application No. 23200622.1 filed Jun. 19, 2025, 32 pp.

* cited by examiner

WIDE AREA NETWORK LINK BANDWIDTH MONITORING

TECHNICAL FIELD

This disclosure generally relates to computer networks and, more specifically, monitoring and/or managing network performance in computer networks.

BACKGROUND

A computer network is a collection of interconnected computing devices that can exchange data and share resources. Example computing devices include routers, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding components for routing or switching data units.

SUMMARY

In general, this disclosure describes techniques for using a machine learning model to predict a maximum bandwidth of a wide area network (WAN) link between two network devices. A pair of network devices (e.g., gateway routers) at different sites in a WAN may connect to each other over the WAN via one or more WAN links (e.g., logical paths) to transmit data between the pair of network devices. For example, a network management system may apply the machine learning model to one or more parameters obtained from the pair of network devices to determine a maximum bandwidth of a WAN link between the pair of network devices more accurately than conventional techniques, even where a third-party network, such as an Internet Services Provider (ISP) network, is interposed between the pair of network devices.

A network device may be able to detect that a WAN link that connects the network device to another network device in the WAN is performing poorly, such as by detecting an increase in packet drops or by detecting that the bandwidth for an application is being throttled. The network device may, in response to detecting the poor performance of the WAN link, attempt to determine the cause of the poor performance of the WAN link by performing a reactive action such as by pinging another network device or by performing a speed test. However, performing such actions may be counterproductive because performing pings and speed tests may add more load on to an overloaded WAN link. Further, the network device may not be able to determine the actual cause of the poor performance of the WAN link by performing pings and speed tests after a problem with the WAN link has already occurred.

The maximum bandwidth of a WAN link may be information that is useful for diagnosing poor performance of the WAN link. For example, a network device may be able to determine, based on a comparison of current bandwidth of the WAN link to the maximum bandwidth of the WAN link, whether the poor performance of the WAN link is due to link exhaustion (e.g., overutilization of the link's available bandwidth). However, conventional techniques for determining a maximum bandwidth, such as pings and speed tests, may not be sufficient to accurately determine a maximum bandwidth of the WAN link due to numerous external factors, such as other traffic on the WAN link, an intermediate third-party network between the pair of network devices, time- and use-dependent network conditions, etc. By more accurately determining a maximum bandwidth of a WAN link, the techniques of the disclosure may provide increased granularity into the determination of whether degraded performance is due to a WAN link becoming exhausted.

In accordance with aspects of this disclosure, a cloud-based network management system (NMS) that monitors performance of a WAN may be able to proactive predict the maximum bandwidth of a WAN link that connects a pair of network devices. The NMS may use the predicted maximum bandwidth of the WAN link to determine the root cause of poor performance of the WAN link and to recommend or invoke one or more remedial actions to address the poor performance of the WAN link.

The NMS may instruct one or more of a pair of network devices at different sites in the WAN that are connected via a WAN link to perform speed tests of the WAN link to obtain one or more parameters related to the WAN link, such as the measured bandwidths of the WAN link. The NMS may apply, to the one or more parameters, a machine learning model trained with parameters of links to predict bandwidths of the links, to predict a maximum bandwidth of the WAN link. The NMS may therefore use the predicted maximum bandwidth of the WAN link to determine the root cause of poor performance of the WAN link and to recommend or invoke one or more remedial actions to address the poor performance of the WAN link.

For example, the NMS may compare the bandwidth usage of the WAN link with the predicted maximum bandwidth of the WAN link to determine whether the WAN link being link exhausted is the root cause of poor performance of the WAN link. Furthermore, if a pair of network devices are connected via a plurality of WAN links, the NMS may use the predicted maximum bandwidth of each of the plurality of WAN links to determine, when a WAN link between a pair of network devices is link exhausted, whether another WAN link that connects the pair of network devices has available bandwidth. If the NMS determines that another WAN link that connects the pair of network devices has available bandwidth, the NMS may recommend or invoke a remedial action of switching network traffic from the link exhausted WAN link to a WAN link that has available bandwidth.

The techniques of the disclosure provide one or more technical advantages specific improvements to the computer-related field of computer networking integrated into practical applications. The techniques may enable the cloud-based NMS to determine information that the NMS may use to identify the root cause of poor performance of a WAN link, such as by identifying that a WAN link is link exhausted. In addition, the techniques of this disclosure may enable the network management system to recommend or initiate remediation measure to address the poor performance of the WAN link, thereby improving the performance of the WAN.

In some aspects, the techniques described herein relate to a network management system including: a memory; and one or more processors in communication with the memory and configured to: instruct a first network device to obtain one or more parameters related to a Wireless Area Network (WAN) link between the first network device and a second network device; execute a machine learning system configured to apply, to the one or more parameters related to the WAN link, a machine learning model, trained with parameters of links to predict bandwidths of the links, to predict a maximum bandwidth of the WAN link; and output an indication of the predicted maximum bandwidth of the WAN link.

In some aspects, the techniques described herein relate to a method including: instructing, by one or more processors of a network management system, a first network device to obtain one or more parameters related to a Wireless Area Network (WAN) link between the first network device and a second network device; executing, by the one or more processors, a machine learning system configured to apply, to the one or more parameters related to the WAN link, a machine learning model, trained with parameters of links to predict bandwidths of the links, to predict a maximum bandwidth of the WAN link; and outputting, by the one or more processors, an indication of the predicted maximum bandwidth of the WAN link.

In some aspects, the techniques described herein relate to a computer-readable storage medium including instructions that, when executed, cause one or more processors of a network management system to: instruct a first network device to obtain one or more parameters related to a Wireless Area Network (WAN) link between the first network device and a second network device; execute a machine learning system configured to apply, to the one or more parameters related to the WAN link, a machine learning model, trained with parameters of links to predict bandwidths of the links, to predict a maximum bandwidth of the WAN link; and output an indication of the predicted maximum bandwidth of the WAN link.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
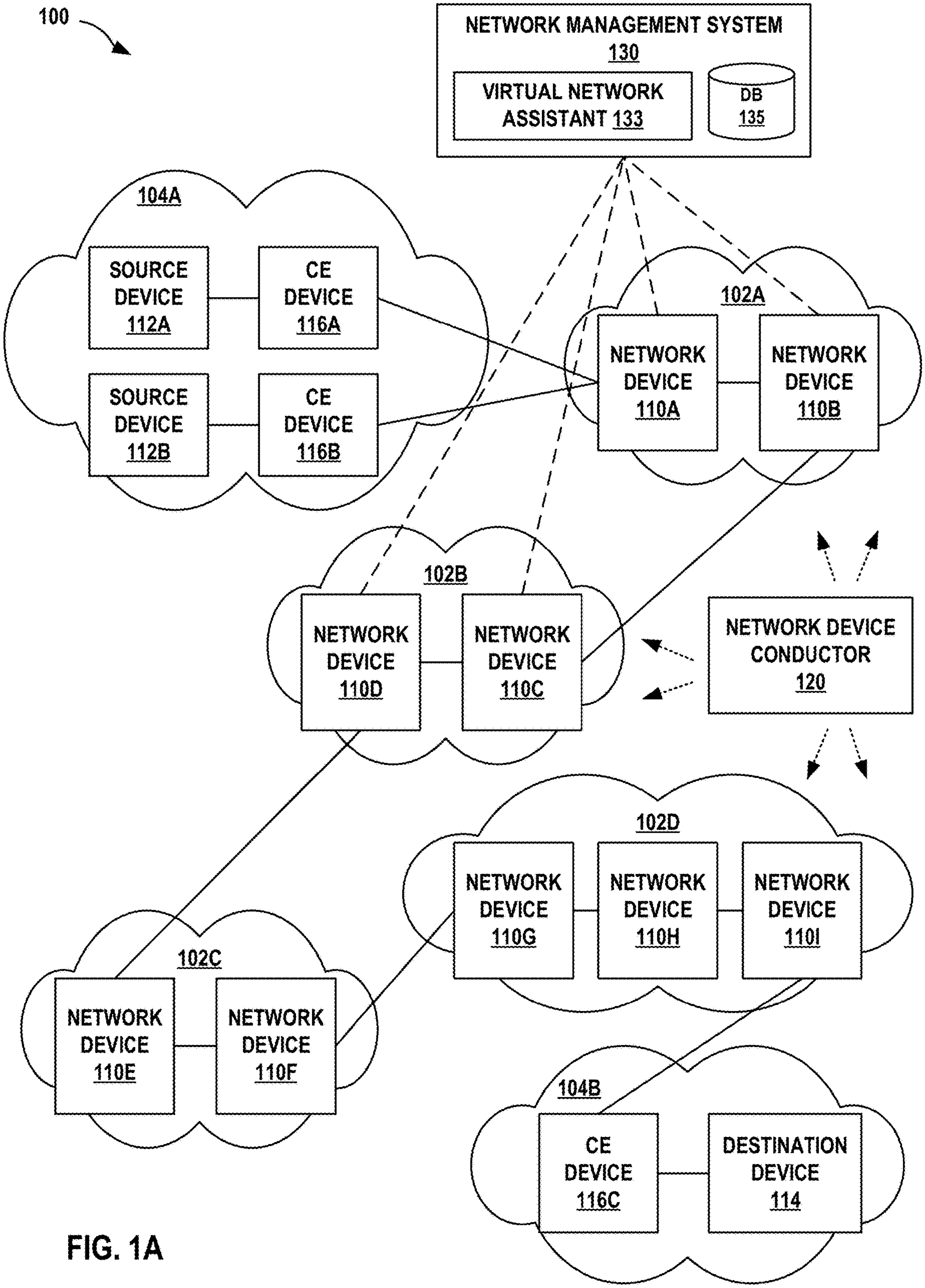
FIGS. 1A-1C are block diagrams illustrating example network systems including a network management system that is configured to predict the maximum bandwidth of WAN links, in accordance with one or more techniques of the disclosure.
Figure 1B:
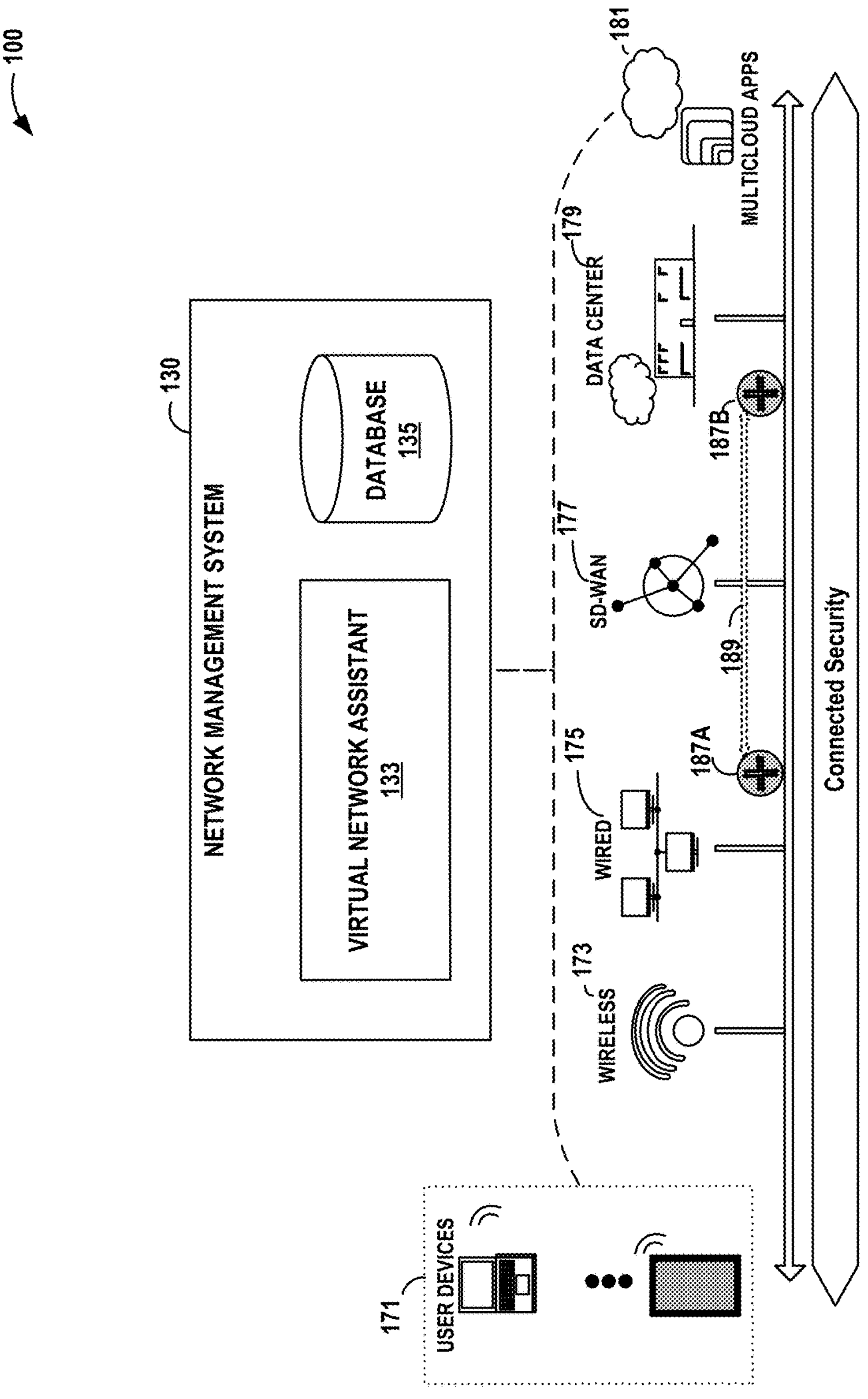
Figure 1C:
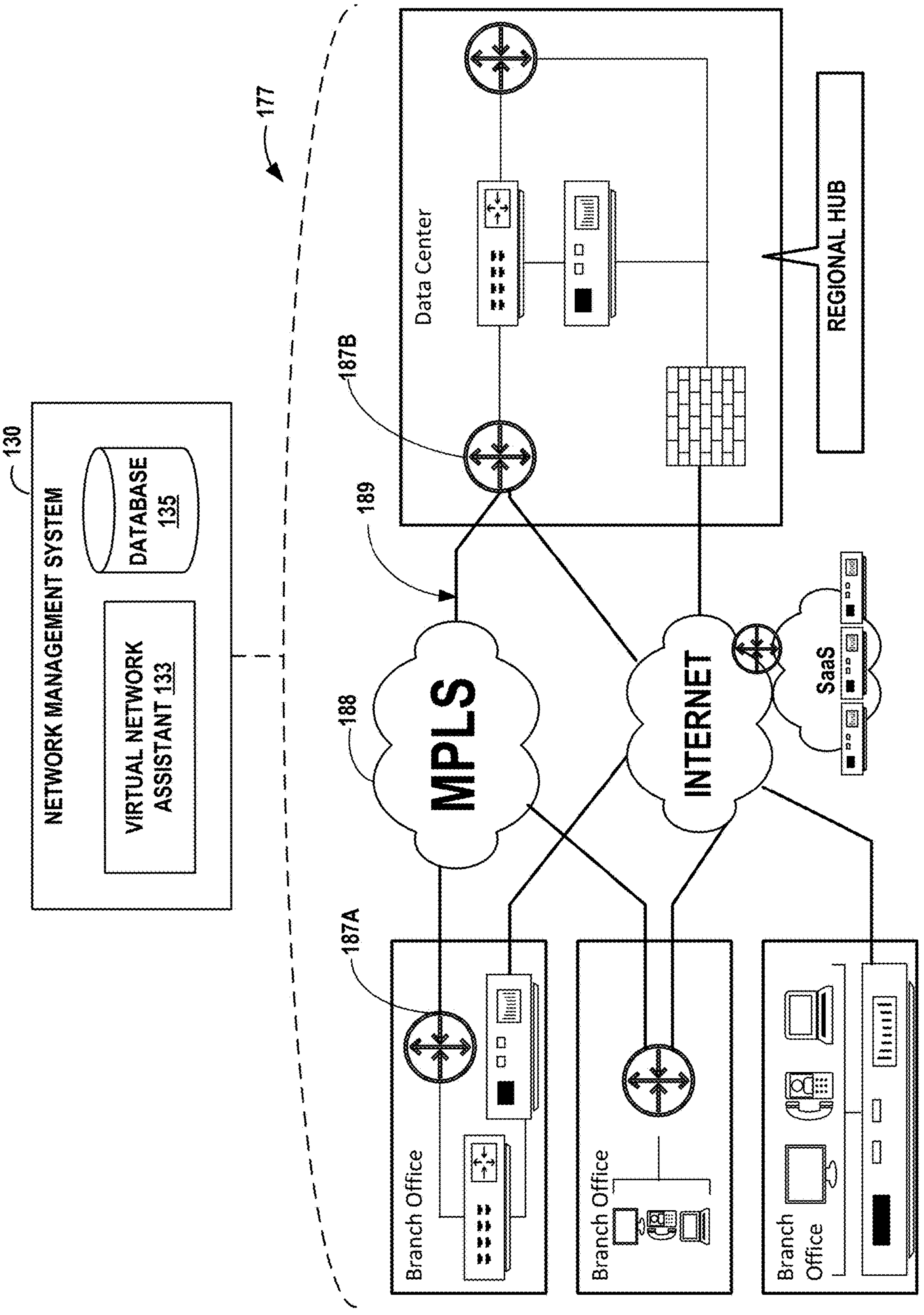

FIGS. 1A-1C are block diagrams illustrating example network systems 100 including a network management system (NMS) 130 that is configured to predict the maximum bandwidth of WAN links, in accordance with one or more techniques of the disclosure.

FIG. 1A is a block diagram illustrating example network system 100 in accordance with the techniques of the disclosure. In the example of FIG. 1A, network system 100 includes networks 102A-102D (collectively, "networks 102") configured to provide Wide Area Network (WAN) connectivity to different customer networks 104A-104B ("customer networks 104") of an enterprise network. In some examples, networks 102 are service provider networks. Although in the example of FIG. 1A, network system 100 is illustrated as including multiple interconnected networks 102, in other examples network system 100 may alternatively include a single network that provides connectivity between customer networks 104.

Network devices 110A-110I (collectively, "network devices 110") of networks 102 provide source devices 112A and 112B (collectively, "source devices 112") and destination device 114 associated with customer networks 104 with access to networks 102 via customer edge devices 116A-116C (collectively, "CE devices 116"). Communication links between network devices 110 may be Ethernet, ATM, or any other suitable network connections.

Network device conductor 120 is a centralized management and policy engine that provides orchestration, administration, and zero-touch provisioning for distributed network devices 110 while maintaining a network-wide, multi-tenant service, and policy data model. Network device conductor 120 may be considered an orchestrator. In some examples, network device conductor 120 also provides monitoring and analytics for network devices 110, while in other examples monitoring and analytics for network devices 110 and/or CE devices 116 are provided by NMS 130 only. In some examples, NMS 130 provides WAN Assurance services to networks 102 and provides Wireless Assurance and/or Wired Assurance services to customer networks 104. In the example of FIG. 1A, NMS 130 includes a virtual network assistant 133 which may provide machine-learning based analytics of data collected by NMS 130 from network devices 110 of networks 102 for the WAN Assurance services, and may provide machine-learning based analytics of data collected by NMS 130 from CE devices 116 or other customer equipment within customer networks 104 for the Wireless Assurance and/or Wired Assurance services.

CE devices 116 and network devices 110 are discussed herein for purposes of example as being routers. However, techniques of the disclosure may be implemented using any network device, such as switches, routers, gateways, or other suitable network devices that may send and receive network traffic. Customer networks 104 may be networks for geographically separated sites of the enterprise network, for example. Each of customer networks 104 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices not depicted in FIG. 1A. The configuration of network system 100 illustrated in FIG. 1A is merely an example. For example, network system 100 may include any number of customer networks 104. Nonetheless, for ease of description, only customer networks 104A-104B are illustrated in FIG. 1A.

Networks 102 represent one or more publicly accessible computer networks that are owned and operated by one or more service providers. A service provider is usually a large telecommunications entity or corporation. Each of networks 102 is usually a large Layer-Three (L3) computer network, where reference to a layer followed by a number refers to a corresponding layer in the Open Systems Interconnection (OSI) model. Each network 102 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each network 102 may be coupled to one or more networks administered by other providers, and may thus form part of a large-scale public network infrastructure, e.g., the Internet. Consequently, customer networks 104 may be viewed as edge networks of the Internet. Each network 102 may provide computing devices within customer networks 104, such as source devices 112 and destination devices 114, with access to the Internet, and may allow the computing devices within customer networks 104 to communicate with each other.

Although additional network devices are not shown for ease of explanation, network system 100 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 100 are illustrated as being directly coupled, one or more additional network elements may be included along any of the communication links between network devices 110, such that the network elements of computer network system 100 are not directly coupled.

Each network 102 typically provides a number of residential and business services for customer networks 104, including residential and business class data services (which are often referred to as "Internet services" in that these data services permit access to the collection of publicly accessible networks referred to as the Internet), residential and business class telephone and/or voice services, and residential and business class television services.

In some examples, network devices 110 comprise packet-based routers that employ a packet- or flow-based routing scheme to forward packets according to defined network paths established by a centralized controller, such as a Software-Defined Networking (SDN) controller, that performs path selection and traffic engineering. A given one of network devices 110, e.g., network device 110A, that comprises a packet-based router operating as a network gateway for customer network 104A may establish multiple tunnels over the WAN with one or more other packet-based routers, e.g., network device 110I, operating as network gateways for other sites of the enterprise network, e.g., customer network 104B. As described herein, each of the packet-based routers may collect data at a tunnel level, and the tunnel data may be retrieved by NMS 130 via an API or an open configuration protocol or the tunnel data may be reported to NMS 130 by a software agent or other module running on the packet-based router.

In other examples, network devices 110 comprise session-based routers that employ a stateful, session-based routing scheme that enables each network device 110 to independently perform path selection and traffic engineering. The use of session-based routing may enable network devices 110 to eschew the use of a centralized controller, such as an SDN controller, to perform path selection and traffic engineering. In this way, network devices 110 may be more efficient and scalable for large networks where the use of an SDN controller would be infeasible. Furthermore, the use of session-based routing may enable network devices 110 to eschew the use of tunnels, thereby saving considerable network resources by obviating the need to perform encapsulation and decapsulation at tunnel endpoints. In some examples, network devices 110 implement session-based routing as Secure Vector Routing (SVR), provided by Juniper Networks, Inc. A given one of network devices 110, e.g., network device 110A, that comprises a session-based router operating as a network gateway for customer network 104A may establish multiple peer paths over the WAN with one or more other session-based routers, e.g., network device 110I, operating as network gateways for other sites of the enterprise network, e.g., customer network 104B. As described herein, each of the session-based routers may include a software agent imbedded in the session-based router configured to report path data collected at a peer path level to NMS 130.

A network session (also referred to herein as a "session") includes a forward packet flow originating from a first device and destinated for a second device and/or a reverse packet flow originating from the second device and destined for the first device. The session may be bidirectional in that the session may include packets travelling in both directions (e.g., a forward packet flow and a reverse packet flow) between the first and second devices.

When, e.g., network device 110A receives a packet for a flow originating from source device 112A and destined for destination device 114, network device 110A determines whether the packet belongs to a new session (e.g., is the "first" packet or "lead" packet of the session). In some examples, network device 110A determines whether a source address, source port, destination address, destination port, and protocol of the first packet matches an entry in a session table. If no such entry exists, network device 110A determines that the packet belongs to a new session and creates an entry in the session table. Furthermore, if the packet belongs to a new session, network device 110A generates a session identifier for the session. The session identifier may comprise, e.g., a source address and source port of source device 112A, a destination address and destination port of destination device 114, and a protocol used by the first packet. Network device 110A may use the session identifier to identify subsequent packets as belonging to the session.

In some examples, network devices 110 perform stateful routing for a session. This means that network devices 110 forward each packet of the forward packet flow of a session sequentially and along the same forward network path. As described herein, the "same" forward path means the same network devices 110 that form a segment or at least a portion between a device originating the packet and a device to which the packet is destined (and not necessarily the entire network path between the device originating the packet and the device to which the packet is destined). Further, network devices 110 forward each packet of the return flow of the session sequentially and along the same return network path. The forward network path for the forward packet flow and the return network path of the return flow may be the same path, or different paths. By ensuring that each packet of a flow is forwarded sequentially and along the same path, network devices 110 maintain the state of the entire flow at each network device 110, thereby enabling the use of stateful packet services, such as Deep Packet Inspection (DPI).

In the example of FIG. 1A, a stateful routing session may be established from ingress network device 110A through intermediate network devices 110B-110H to egress network device 110I. In this example, network device 110A determines that the first packet is an unmodified packet and the first packet of a new session. Network device 110A modifies the first packet to include metadata specifying the session identifier (e.g., the original source address, source port, destination address, and destination port). Network device 110A replaces the header of the modified first packet to specify a source address that is an address of network device 110A, a source port that is a port via which network device 110A forwards the modified first packet toward destination device 114, a destination address that is an address of the next hop to which network device 110A forwards the first packet (e.g., an address of network device 110B), and a destination port that is a port of the next hop to which network device 110A forwards the first packet (e.g., a port of network device 110B).

Network device 110A may further identify a network service associated with the session. For example, network device 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, if the source port and/or destination port for the session is 80, network device may determine that the session is associated with HTTP. In other examples, network device 110A may determine that one or more of a source address, source port, destination address, or destination port for the session belong to a block of address or ports indicative that a particular service is associated with the session.

In some examples, network device 110A uses the determined network service for the session to select a forward path for forwarding the first packet and each subsequent packet toward destination device 114. In this fashion, network device 110A may perform service-specific path selection to select a network path that best suits the requirements of the service. In contrast to a network topology that uses an SDN controller to perform path selection, each network device 110 performs path selection. Further, the use of session-based routing enables each network device 110 to make routing decisions at the service- or application-level, in contrast to conventional network devices that are only able to make routing decisions at the flow level.

Network device 110A forwards the modified first packet to network device 110B. Additionally, network device 110A stores the session identifier for the session such that, upon receiving subsequent packets for the session, network device 110A may identify subsequent packets as belonging to the same session and forward the subsequent packets along the same path as the first packet.

Intermediate network device 110B receives the modified first packet and determines whether the modified first packet includes a portion of metadata specifying the session identifier. In response to determining that the modified first packet includes metadata specifying the session identifier, intermediate network device 110B determines that network device 110B is not an ingress device such that network device 110B does not attach metadata specifying the session identifier.

As described above with respect to network device 110A, network device 110B determines whether the packet belongs to a new session (e.g., is the "first" packet or "lead" packet of the session) by determining whether a source address, source port, destination address, destination port, and protocol of the first packet matches an entry in a session table. If no such entry exists, network device 110B determines that the packet belongs to a new session and creates an entry in the session table. Furthermore, if the packet belongs to a new session, network device 110B generates a session identifier for the session. The session identifier used by network device 110B to identify the session for the first packet may be different from the session identifier used by network device 110A to identify the same session for the first packet, because each network device 110A, 110B uses the header source address, source port, destination address, and destination port of the first packet to generate the session identifier, and this information is modified by each preceding network device 110 as each network device 110 forwards the first packet along the forward path. Furthermore, each network device 110 may store this header information to identify a previous network device 110 (or "waypoint") and a next network device 110 (or "waypoint") such that each network device 110 may reconstruct the same forward path and reverse path for each subsequent packet of the session.

Network device 110B replaces the header of the modified first packet to specify a source address that is an address of network device 110B, a source port that is a port via which network device 110B forwards the modified first packet toward destination device 114, a destination address that is an address of the next hop to which network device 110B forwards the first packet (e.g., an address of network device 110C), and a destination port that is a port of the next hop to which network device 110B forwards the first packet (e.g., a port of network device 110C). Network device 110B forwards the modified first packet to network device 110C. Additionally, network device 110B stores the session identifier for the session such that, upon receiving subsequent packets for the session, network device 110B may identify subsequent packets as belonging to the same session and forward the subsequent packets along the same path as the first packet.

Subsequent intermediate network devices 110C-110H process the modified first packet in a similar fashion as network devices 110A and 110B such that network devices 110 forward the subsequent packets of the session along the same path as the first packet. Further, each network device 110 stores a session identifier for the session, which may include an identification of the previous network device 110 along the network path. Thus, each network device 110 may use the session identifier to forward packets of the reverse packet flow for the session along the same network path back to source device 112A.

A network device 110 that may forward packets for a forward packet flow of the session to a destination for the packet flow is an egress, or "terminus" network device. In the foregoing example, network device 110I is a terminus network device because network device 110I may forward packets to CE device 116C for forwarding to destination device 114. Network device 110I receives the modified first packet that comprises the metadata specifying the session identifier (e.g., the original source address, source port, destination address, and destination port). Network device 110I identifies the modified first packet as destined for a service terminating at network device 110I by determining that the destination source address and destination source port specified in the metadata of the modified lead packet corresponds to a destination reachable by network device 110I (e.g., destination device 114 via CE device 116C). Network device 110I recovers the original first packet by removing the metadata from the modified first packet and modifying the header of the first packet to specify the original source address, source port, destination address, and destination port. Network device 110I forwards the recovered first packet to CE device 116C for forwarding to destination device 114.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; and U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, to implement session-based routing, each network device 110 maintains a local repository of service and topology state information for each other network device 110. The service and topology state information includes services reachable from each network device 110, as well as a network topology from each network device for reaching these services. Each network device 110 may transmit changes in the services reachable from the network device 110 and/or changes in the network topology for reaching the services from the network device to a central repository, e.g., a server. Further, each network device 110 may receive service and topology state information for each other network device 110 in computer network system 100 from the central repository.

In the foregoing example, network device 110A receives a packet, determines a session for a packet flow comprising the packet, determines a service associated with the session, and selects a network path for forwarding the packet. Network device 110A may use its local copy of the service and topology state information for each network device 110 to select the network path for forwarding the packet. For example, network device 110A may use the identified service associated with the packet and a network topology for reaching the identified service to select a network path that comports with a Service Level Agreement (SLA) requirement or other performance requirements for the service. Network device 110A may then forward the packet and subsequent packets for the flow along the selected path. In this fashion, network device 110A may perform service-specific path selection in that network device 110 may use criteria specific to the service associated with the packet to select a network path that best suits the requirements of the service. In other examples, network device 110A may select a network path that avoids (i.e., does not include) one or more paths that are outliers in network performance, as discussed in further detail below, in order to select a network path having a high network performance.

In some examples, interfaces of network devices 110 may be assigned to one or more "neighborhoods." A "neighborhood" is defined as a label applied to an interface of a network device 110. The network devices 110 within the same neighborhood are capable of forming a peering relationship with one another. For example, each network device 110 having an interface to which a neighborhood label is applied is reachable over a Layer-3 network to each other network device 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each network device 110 maintains a local repository of service and topology state information only for those other network devices 110 within the same neighborhood. In some examples, each network device 110 maintains a local repository of service and topology state information only for those other network devices 110 within the same district of neighborhoods. As an example, each service provider network 102 may be considered to be a different "district," wherein each subdomain within each service provider network 102 may be considered to be a neighborhood within that district. In this example, each network device 110A and 110B within service provider network 102A may maintain service and topology state information only for one another, and not for network devices 110C-110I. Similarly, each network device 110D and 110C within service provider network 102B may maintain service and topology state information only for one another, and not for network devices 110A-110B or 110E-110I. In other examples, an administrator may assign one or more service provider networks 102 into one or more districts, one or more neighborhoods, or a combination of districts and neighborhoods as suits the needs of network system 100.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

In accordance with the techniques described in this disclosure, NMS 130 is configured to predict the maximum bandwidth of WAN links that connect pairs of network devices 110 in network 102. A WAN link that connects a pair of network devices 110 may be a logical path (e.g., a peer path for a session-based router or a tunnel for a packet-based router) in network 102 over which the pair of network devices 110 may communicate by transmitting and receiving data over the WAN link. The maximum bandwidth of a WAN link may be a maximum data transfer rate of the WAN link, which may be in terms of megabits per second, gigabits per second, and the like.

NMS 130 is configured to predict the maximum bandwidth of a WAN link that connects a pair of network devices 110 in network 102, such as a WAN link that connects network device 110A to network device 110G in network 102, based on obtaining one or more parameters related to the WAN link between the pair of network devices 110. The one or more parameters related to the WAN link may indicate the behavior of the WAN link during periods of different usage levels of the WAN link, such as the behavior of the WAN link during periods of low usage and/or the behavior of the WAN link during periods of heavy usage. The one or more parameters related to the WAN link may indicate the behavior of the WAN link during maintenance windows of one or more of the pair of network devices 110 connected via the WAN link. The one or more parameters related to the WAN link may indicate the behavior of the WAN link at different times of the day.

In some examples, virtual network assistant 133 is configured to obtain the one or more parameters related to a WAN link that connects a pair of network devices 110 based on performing speed tests of the WAN link. For example, virtual network assistant 133 may instruct one or more of a pair of network devices connected via the WAN link to perform speed tests of the WAN link between the pair of network devices in order to obtain one or more parameters related to the WAN link. Such one or more parameters related to the WAN link obtained from performing a speed test of the WAN may include measurements of the bandwidth of the WAN link, such as the maximum bandwidth measured during the speed test, the minimum bandwidth measured during the speed test, and the like. The one or more parameters related to the WAN link obtained from performing a speed test of the WAN may include measurements of the bandwidth of the WAN link may also include measurements of the bandwidth of an interface of a network device connected to the WAN link, such as the maximum bandwidth measured during the speed test, the minimum bandwidth measured during the speed test, and the like.

Virtual network assistant 133 may communicate with one or more of a pair of network devices connected via the WAN link to schedule performance of the speed tests of the WAN link. In some examples, virtual network assistant 133 may schedule performance of speed tests of the WAN link during periods of different usage rates or usage levels of the WAN link, such as during periods of high usage of the WAN link and/or periods of low usage of the WAN link. In some examples, virtual network assistant 133 may schedule performance of the speed tests of the WAN link during maintenance windows of the first network device and/or the second network device, such as during time windows immediately after the first network device and/or the second network device have been upgraded. In some examples, virtual network assistant 133 may schedule performance of the speed tests of the WAN link during different times of the day. Additional information with respect to scheduling performance of tests of links and/or network devices are is described in U.S. Provisional Patent Application No. 63/477,964, entitled "SYNTHETIC TESTING," filed Dec. 30, 2022 and in U.S. Provisional Patent Application No. 63/501,786, entitled "SYNTHETIC TESTING," filed May 12, 2023, the entire content of each of which is incorporated herein by reference in its entirety.

Virtual network assistant 133 may therefore be able to obtain, based on the speed tests of the WAN link over a particular time period, such as over one week, two weeks, a month, and the like, parameters related to the WAN link. Such parameters may include measurements of the bandwidth of the WAN link obtained during different usage rates associated with the WAN link, measurements of the bandwidth of a network device's interface obtained during the different usage rates associated with the WAN link, measurements of the bandwidth of the WAN link obtained during a maintenance window of network devices, and/or measurements of the bandwidth of the WAN link obtained during different times of day.

Virtual network assistant 133 is configured to apply, to the one or more parameters related to the WAN link, a machine learning model trained with parameters of links to predict bandwidths of the links, to predict a maximum bandwidth of the WAN link. That is, virtual network assistant 133 may input the one or more parameters related to the WAN link obtained from the first network device into a machine learning model, and the machine learning model may output a predicted maximum bandwidth of the WAN link, which NMS 130 may store in database 135.

Virtual network assistant 133 is configured to output an indication of the predicted maximum bandwidth of the WAN link between the first network device and the second network device. For example, virtual network assistant 133 may generate and output notifications, e.g., to the network administrator of the WAN that indicate the predicted maximum bandwidth of the WAN link.

Virtual network assistant 133 may use the predicted maximum bandwidth of the WAN link to detect an issue (e.g., a fault) with the WAN link at a given point in time and/or to determine the root cause of the issue with the WAN link. For example, virtual network assistant 133 may detect a performance issue with the WAN link by measuring the bandwidth of the WAN link at the given point in time and comparing the measured bandwidth of the WAN link to the predicted maximum bandwidth of the WAN link. If virtual network assistant 133 determines that the measured bandwidth of the WAN link is smaller than the predicted maximum bandwidth of the WAN link by at least a predetermined amount, such as being 90% smaller than the predicted maximum bandwidth of the WAN link, being 95% smaller than the predicted maximum bandwidth of the WAN link, and the like, virtual network assistant 133 may determine that there is a performance issue associated with the WAN link and may determine that the poor performance of the WAN link is due to link exhaustion. Link exhaustion may occur when the available bandwidth of a link is overutilized, such as when an available bandwidth of the link is less than an amount of bandwidth required to satisfy the demands of network traffic exchanged over the link.

In some examples, NMS 130 may generate and output notifications with recommendations to perform one or more remedial actions to address issues with the WAN link or may automatically invoke one or more remedial actions address issues with the WAN link. For example, if virtual network assistant 133 determines that a WAN link that connects a pair of network devices 110 is link exhausted, virtual network assistant 133 may determine if there is another WAN link that connects the pair of network devices 110 that is not link exhausted. If virtual network assistant 133 determines that there is another WAN link that connects the pair of network devices 110 that is not link exhausted, virtual network assistant 133 may output a notification to recommend switching network traffic from the link exhausted WAN link to the non-exhausted WAN link, or may automatically perform a remedial action of switching network traffic from the link exhausted WAN link to the non-exhausted WAN link.

The techniques of the disclosure provide one or more technical advantages and practical applications. The techniques may enable the cloud-based NMS 130 to more accurately determine the maximum bandwidth of a WAN link by using a machine learning model that predicts the maximum bandwidth of a WAN link based on parameters related to the WAN link obtained from speed tests performed on the WAN link.

The techniques of this disclosure may increase the performance of a WAN link by reducing the network load that may be placed on the WAN link to determine the maximum bandwidth of the WAN link and/or to diagnose performance issues related to the WAN network. By being able to schedule the performance of speed tests of a WAN link, such as during periods of low usage of the WAN link, the techniques may also enable the NMS to reduce the impact of such speed tests on the performance of the WAN link. Further, by determining the maximum bandwidth of a WAN link based on speed tests performed on the WAN link during previous periods of time, the techniques of this disclosure may obviate the need to perform reactive tests such as pinging or speed tests after a performance issue related to the WAN link is detected, thereby preventing additional network traffic from being added to a WAN link that may already be suffering from performance degradation.

In addition, the techniques of this disclosure may be able to identify a root cause of performance issues related to a WAN link and may recommend or invoke one or more remedial actions to address performance issues related to the WAN link. By determining the maximum bandwidth of a WAN link and by comparing the maximum bandwidth of the WAN link with the amount of bandwidth of the WAN link that is currently being used, the techniques of this disclosure may be able to determine whether the root cause of performance issues related to a WAN link is link exhaustion. Further, the techniques of this disclosure may be able to recommend and/or invoke remedial actions such as switching an application and/or a session from the link exhausted WAN link to another WAN link having available bandwidth capacity, thereby improving the performance of applications that transmits data from a network devices to another network device.

FIG. 1B is a block diagram illustrating further example details of network system 100 of FIG. 1A. In this example, FIG. 1B illustrates NMS 130 configured to operate according to an artificial intelligence/machine-learning-based computing platform providing comprehensive automation, insight, and assurance (e.g., Wireless Assurance, Wired Assurance and/or WAN Assurance) spanning from a wireless network 173 and wired LAN 175 at the network edge (far left of FIG. 1B) to cloud-based application services 181 hosted by computing resources within data centers 179 (far right of FIG. 1B). Referring back to FIG. 1A, user devices 171 may comprise one or more of source devices 112 and destination device 114, and wired LAN 175 hosting wireless network 173 may comprise one or more customer networks 104 of the enterprise network.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network system 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 173 and wired LANs 175 to data centers 179 and application services 181. In general, SD-WAN 177 provides seamless, secure, traffic-engineered connectivity between "spoke" network devices 187A of edge wired networks 175 hosting wireless networks 173, such as branch or campus networks (e.g., customer networks 104 from FIG. 1A as sites of an enterprise network), to "hub" routers 187B further up the cloud stack toward cloud-based application services 181. Referring back to FIG. 1A, network devices 187A, 187B may comprise network devices 110 operating as network gateways for the enterprise network.

SD-WAN 177 often operates and manages an overlay network on an underlying physical Wide-Area Network (WAN), which provides connectivity to geographically separate customer networks, e.g., customer networks 104 of FIG. 1A. In other words, SD-WAN 177 may extend SDN capabilities and/or session-based routing or SVR capabilities to a WAN that allow networks to decouple underlying physical network infrastructure from virtualized network infrastructure and applications such that the networks may be configured and managed in a flexible and scalable manner.

In some examples, underlying network devices of SD-WAN 177 may implement a stateful, session-based routing scheme in which the network devices 187A, 187B dynamically modify contents of original packet headers sourced by user devices 171 to steer traffic along selected paths, e.g., peer path 189, toward application services 181 without requiring use of tunnels and/or additional labels. In this way, network devices 187A, 187B may be more efficient and scalable for large networks since the use of tunnel-less, session-based routing may enable network devices 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, network devices 187A, 187B implement session-based routing as SVR, provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STA- TUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 173, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with the techniques described in this disclosure, NMS 130 is configured to predict the maximum bandwidth of a WAN link between a pair of network devices, such as the maximum bandwidth of logical path 189 (e.g., peer path or tunnel) between network devices 187A, 187B in SD-WAN 177. In some examples, one or more intermediate third-party networks, such as one or more Internet Service Provider (ISP) networks, access networks, or transport networks may underlay logical path 189 so as to provide connectivity between router 187A, 187B. NMS 130 may communicate with router 187A and/or router 187B to schedule performance of speed tests over a specified time period, such as over a month, to obtain, from the speed tests, parameters such as the measured bandwidth of logical path 189 and/or the measured bandwidth of interfaces of router 187A and/or router 187B connected to logical path 189.

NMS 130 may schedule performance of speed tests of logical path 189 during periods of different usage rates or usage levels of logical path 189, such as during periods of high usage of logical path 189 and/or periods of low usage of logical path 189. In some examples, NMS 130 may schedule performance of the speed tests of logical path 189 during maintenance windows of router 187A and/or router 187B, such as during time windows immediately after router 187A and/or router 187B have been upgraded. In some examples, NMS 130 may schedule performance of the speed tests of logical path 189 during different times of the day.

NMS 130 is configured to apply, to the one or more parameters related to path 189, a machine learning model trained with parameters of links to predict bandwidths of the links, to predict a maximum bandwidth of the 189. That is, NMS 130 may input the one or more parameters related to logical path 189 into a machine learning model, and the machine learning model may output a predicted maximum bandwidth of logical path 189, which NMS 130 may store in database 135.

NMS 130 is configured to output an indication of the predicted maximum bandwidth of logical path 189 between network devices 187A, 187B. For example, virtual network assistant 133 may generate and output notifications, e.g., to the network administrator of SD-WAN 177 that indicate the predicted maximum bandwidth of logical path 189.

In some examples, NMS 130 is configured to use the predicted maximum bandwidth of logical path 189 to determine a fault in logical path 189 and/or to determine the root cause of the fault in logical path 189. For example, virtual network assistant 133 may detect a performance issue with logical path 189 by measuring the bandwidth of logical path 189 at the given point in time and comparing the measured bandwidth of logical path 189 to the predicted maximum bandwidth of logical path 189. If virtual network assistant 133 determines that the measured bandwidth of the WAN link is smaller than the predicted maximum bandwidth of the WAN link by at least a predetermined amount, virtual network assistant 133 may determine that there is a performance issue associated with logical path 189 and may determine that the poor performance of logical path 189 is due to link exhaustion.

In some examples, NMS 130 is configured to generate and output notifications with recommendations to perform one or more remedial actions to address the fault with logical path 189 and/or to automatically invoke one or more remedial actions to address the fault with logical path 189. For example, if virtual network assistant 133 determines that logical path 189 is exhausted, virtual network assistant 133 may output a recommendation to avoid forwarding network traffic via logical path 189 and/or to switch one or more applications that are using logical path 189 to using another logical path between network devices 187A, 187B having available bandwidth, or may automatically switch one or more applications from using logical path 189 to another logical path between network devices 187A, 187B.

FIG. 1C is a block diagram illustrating further example details of network system 100 of FIG. 1B. In particular, FIG. 1C illustrates an example SD-WAN deployment architecture of SD-WAN 177 of FIG. 1B. In the illustrated example, SD-WAN 177 includes a spoke router 187A within a branch office connecting to a hub router 187B in a data center via logical path 189 over the underlying physical WAN, e.g., MPLS network 188. SD-WAN 177 also includes a hosted or Software as a Service (SaaS) applications.

When troubleshooting SD-WAN issues, it may be beneficial to separate the issues into three segments: 1) branch office, 2) logical path (e.g., peer path or tunnel) over WAN, e.g., MPLS, LTE or Broadband network, and 3) application services including both internally hosted applications (e.g., in the data center) and SaaS applications. NMS 130 may be configured to track the temporal connectivity topology of these three segments for each customer deployment and also detect various types of user-impacting issues in virtual network assistant 133. By joining the connectivity topology with the corresponding events happened in each segment, virtual network assistant 133 of NMS 130 may be able to pinpoint the location and root cause of different user-impacting SD-WAN issues. Examples of user-impacting issues for the branch office segment may include device health, bad cable, and configuration issues (e.g., maximum transmission unit (MTU)). Examples of user-impacting issues for the logical path segment may include link connectivity and link performance degradation. Examples of user-impacting issues for the application services segment may include service reachability and service performance.

In accordance with the techniques described in this disclosure, NMS 130 is configured to predict the maximum bandwidth of a WAN link between a pair of network devices, such as the maximum bandwidth of logical path 189 (e.g., peer path or tunnel) between network devices 187A, 187B in SD-WAN 177. NMS 130 may communicate with router 187A and/or router 187B to schedule performance of speed tests over a specified time period, such as over a month, to obtain, from the speed tests, parameters such as the measured bandwidth of logical path 189 and/or the measured bandwidth of interfaces of router 187A and/or router 187B connected to logical path 189.

NMS 130 may schedule performance of speed tests of logical path 189 during periods of different usage rates or usage levels of logical path 189, such as during periods of high usage of logical path 189 and/or periods of low usage of logical path 189. In some examples, NMS 130 may schedule performance of the speed tests of logical path 189 during maintenance windows of router 187A and/or router 187B, such as during time windows immediately after router 187A and/or router 187B have been upgraded. In some examples, NMS 130 may schedule performance of the speed tests of logical path 189 during different times of the day.

NMS 130 is configured to apply, to the one or more parameters related to path 189, a machine learning model trained with parameters of links to predict bandwidths of the links, to predict a maximum bandwidth of logical path 189. That is, NMS 130 may input the one or more parameters related to logical path 189 into a machine learning model, and the machine learning model may output a predicted maximum bandwidth of logical path 189, which NMS 130 may store in database 135.

NMS 130 is configured to output an indication of the predicted maximum bandwidth of logical path 189 between network devices 187A, 187B. For example, virtual network assistant 133 may generate and output notifications, e.g., to the network administrator of SD-WAN 177 that indicate the predicted maximum bandwidth of logical path 189.

In some examples, NMS 130 is configured to use the predicted maximum bandwidth of logical path 189 to determine a fault in logical path 189 and/or to determine the root cause of the fault in logical path 189. For example, virtual network assistant 133 may detect a performance issue with logical path 189 by measuring the bandwidth of logical path 189 at the given point in time and comparing the measured bandwidth of logical path 189 to the predicted maximum bandwidth of logical path 189. If virtual network assistant 133 determines that the measured bandwidth of the WAN link is smaller than the predicted maximum bandwidth of the WAN link by at least a predetermined amount, virtual network assistant 133 may determine that there is a performance issue associated with logical path 189 and may determine that the poor performance of logical path 189 is due to link exhaustion.

In some examples, NMS 130 is configured to generate and output notifications with recommendations to perform one or more remedial actions to address the fault with logical path 189 and/or to automatically invoke one or more remedial actions to address the fault with logical path 189. For example, if virtual network assistant 133 determines that logical path 189 is exhausted, virtual network assistant 133 may output a recommendation to avoid forwarding network traffic via logical path 189 and/or to switch one or more applications that are using logical path 189 to using another logical path between network devices 187A, 187B having available bandwidth, or may automatically switch one or more applications from using logical path 189 to another logical path between network devices 187A, 187B.

Figure 2:
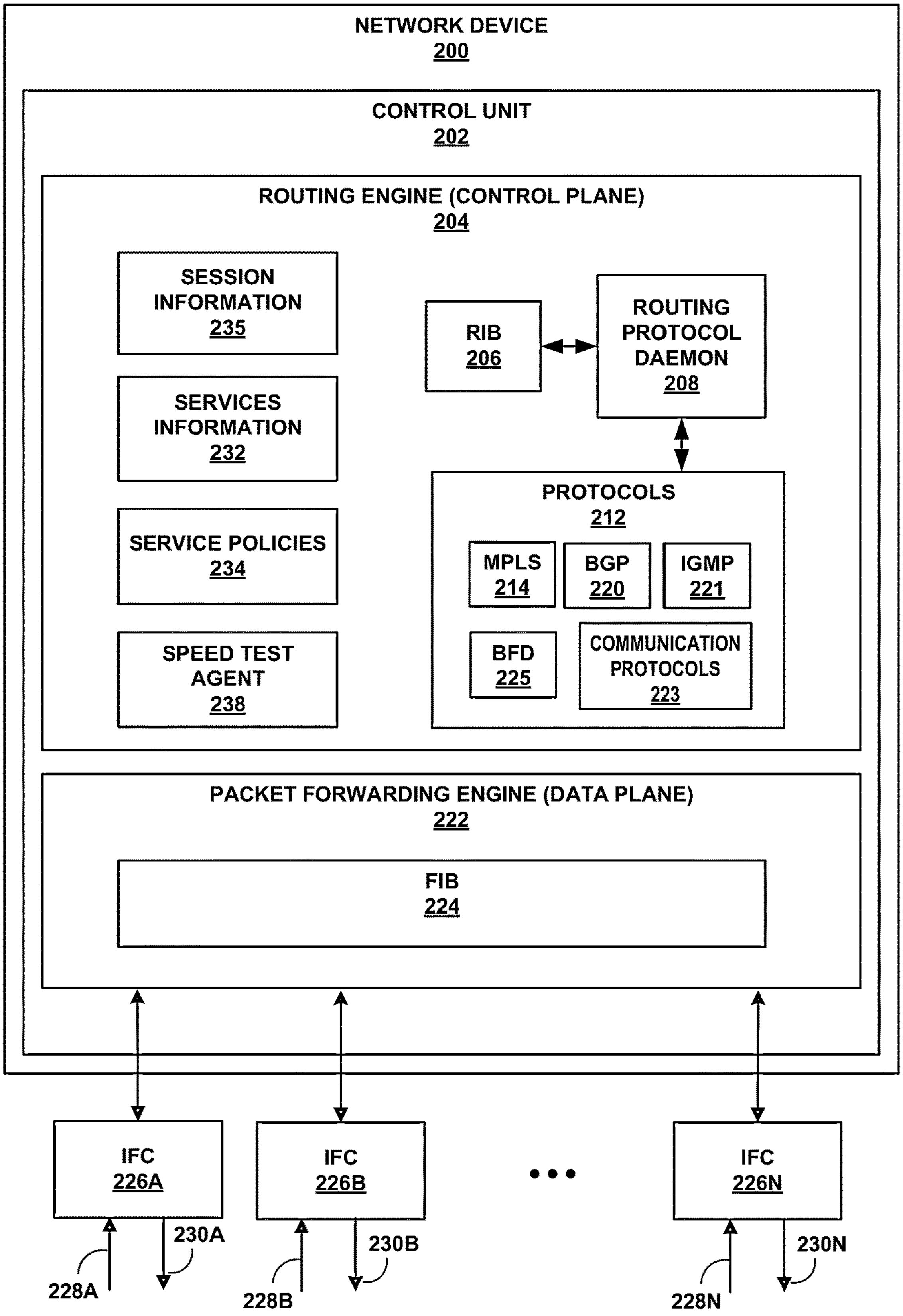
FIG. 2 is a block diagram illustrating an example network device in accordance with the techniques of the disclosure.

FIG. 2 is a block diagram illustrating an example network device 200 in accordance with the techniques of the disclosure. In general, network device 200 may be an example of one of network devices 110 of FIG. 1A or one of network devices 187A, 187B of FIGS. 1B and 1C. In this example, network device 200 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Network device 200 also includes a control unit 202 that determines routes of received packets and forwards the packets accordingly via IFCs 226.

Control unit 202 may comprise routing engine 204 and packet forwarding engine 222. Routing engine 204 operates as the control plane for network device 200 and includes an operating system that provides a multi-tasking operating environment for execution of a number of concurrent processes. Routing engine 204 communicates with other routers, e.g., such as network devices 110 of FIG. 1A, to establish and maintain a computer network, such as network system 100 of FIGS. 1A-1C, for transporting network traffic between one or more customer devices. Routing protocol daemon (RPD) 208 of routing engine 204 executes software instructions to implement one or more control plane networking protocols 212. For example, protocols 212 may include one or more routing protocols, such as Internet Group Management Protocol (IGMP) 221 and/or Border Gateway Protocol (BGP) 220, for exchanging routing information with other routing devices and for updating routing information base (RIB) 206, Multiprotocol Label Switching (MPLS) protocol 214, and other routing protocols. Protocols 212 may further include one or more communication session protocols 223, such as TCP, UDP, TLS, or ICMP. Protocols 212 may also include one or more performance monitoring protocols, such as BFD 225.

RIB 206 may describe a topology of the computer network in which network device 200 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from a client device, e.g., source device 112A of FIG. 1A, and destined for another client device, e.g., destination device 114 of FIG. 1A, routing engine 204 determines whether the packet belongs to a new session (e.g., is the "first" packet or "lead" packet of a session). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 for the session to identify subsequent packets as belonging to the same session.

Services information 232 stores information that routing engine 204 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing engine 204 may query services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In some examples, network device 200 may comprise a session-based router that employs a stateful, session-based routing scheme that enables routing engine 204 to independently perform path selection and traffic engineering. The use of session-based routing may enable network device 200 to eschew the use of a centralized controller, such as an SDN controller, to perform path selection and traffic engineering, and eschew the use of tunnels. In some examples, network device 200 may implement session-based routing as Secure Vector Routing (SVR), provided by Juniper Networks, Inc. In the case where network device 200 comprises a session-based router operating as a network gateway for a site of an enterprise network, network device 200 may establish multiple peer paths over an underlying physical WAN with one or more other session-based routers operating as network gateways for other sites of the enterprise network.

Although primarily described herein as a session-based router, in other examples, network device 200 may comprise a packet-based router in which routing engine 204 employs a packet- or flow-based routing scheme to forward packets according to defined network paths, e.g., established by a centralized controller that performs path selection and traffic engineering. In the case where network device 200 comprises a packet-based router operating as a network gateway for a site of an enterprise network, network device 200 may establish multiple tunnels over an underlying physical WAN with one or more other packet-based routers operating as network gateways for other sites of the enterprise network.

In accordance with the techniques of the disclosure, control unit 202 of network device 200 is configured to perform speed tests of WAN links between network device 200 and other network devices in SD-WAN 177 and to collect data associated with the speed tests. For example, speed test agent 238 may execute at network device 200 to perform speed tests of a WAN link between network device 200 and other network devices in SD-WAN 177. Speed test agent 238 may collect speed test data, such as the measured maximum bandwidth of the WAN link during the speed test and the measured maximum bandwidth of an interface (e.g., one of IFCs 226) connected to the WAN link, and may report the speed test data to NMS 130.

Speed test agent 238 may perform a speed test of a WAN link to measure the maximum bandwidth of the WAN link during the speed test and/or to measure the maximum bandwidth of an interface of network device 200 connected to the WAN link via any suitable speed test technique. For example, speed test agent 238 may send, via the WAN link to another network device connected to network device 200 via the WAN link, a series of very large messages and may measure the end-to-end throughput of the WAN link when transmitting the series of messages to measure the maximum bandwidth of the WAN link during the speed test.

In some examples, speed test agent 238 may schedule speed tests of a WAN link based on the usage level of the WAN link. For example, speed test agent 238 may schedule speed tests during periods of high usage of the WAN link and periods of low usage of the WAN link. Speed test agent 238 may determine the usage level of a WAN link via any suitable technique, such as based on the number of sessions in the WAN link, the number of applications using the WAN link, the amount of bandwidth of the WAN link that is being used, and the like. For example, speed test agent 238 may determine that the usage level of the WAN link is low if the amount of bandwidth of the WAN link that is being used is below a specified low usage threshold, and may determine that the usage level of the WAN link is high if the amount of bandwidth of the WAN link that is being used is above a specified high usage threshold.

In some examples, speed test agent 238 may schedule speed tests of a WAN link during maintenance windows of router device 200, where a maintenance window may be a time window immediately after network device 200 has been upgraded or a time window immediately after network device 200 has been restarted. Such a time window may be a 30 minute time window immediately after network device 200 has been upgraded or restarted, a 1 hour time window immediately after network device 200 has been upgraded or restarted, and the like.

In some examples, speed test agent 238 may schedule speed tests of a WAN link at specific times of the day. Such specific times of the day may be based on the occurrence of network choke events at the WAN link. A network choke event may occur at the WAN link when the WAN link experiences a high volume of network traffic and becomes overloaded. For example, a network event may occur at the WAN link when the network traffic over the WAN link consumes almost all of the bandwidth of the WAN link, such as when the network traffic over the WAN link consumes 99% or more of the maximum bandwidth of the WAN link.

Speed test agent 238 may be able to detect occurrences of network choke events at the WAN link by monitoring the performance of the WAN link, such as by monitoring WAN link metrics such as latency jitter, and loss, application metrics such as retransmissions and round-trip time for TCP acknowledgements, metrics regarding correlation of degraded link performance with high bandwidth usage, metrics regarding long term link stability, and/or a quality of service (e.g., a mean opinion score) of the WAN link. For example, if speed test agent 238 determines that the latency, jitter, and/or loss of the WAN link suddenly spikes above a specified threshold for a specified period of time, speed test agent 238 may determine that a network choke event has occurred at the WAN link.

Speed test agent 238 may determine, based on the occurrences of network choke events at the WAN link, times of the day in which network choke events are likely to occur at the WAN link, and may schedule speed tests of the WAN link for a time of the day that is a specified amount of time (e.g., 1 hour) before the likely occurrence of a network choke event. For example, if speed test agent 238 detects daily occurrences of a network choke event at 12:12 PM, speed test agent 238 may determine that a network choke event is likely to occur each day at 12:12 PM, and may therefore schedule speed tests of the WAN link for a time of the day that is a specified amount of time before the likely occurrence of a network choke event, such as by scheduling speed tests at 11:12 AM each day.

Figure 3:
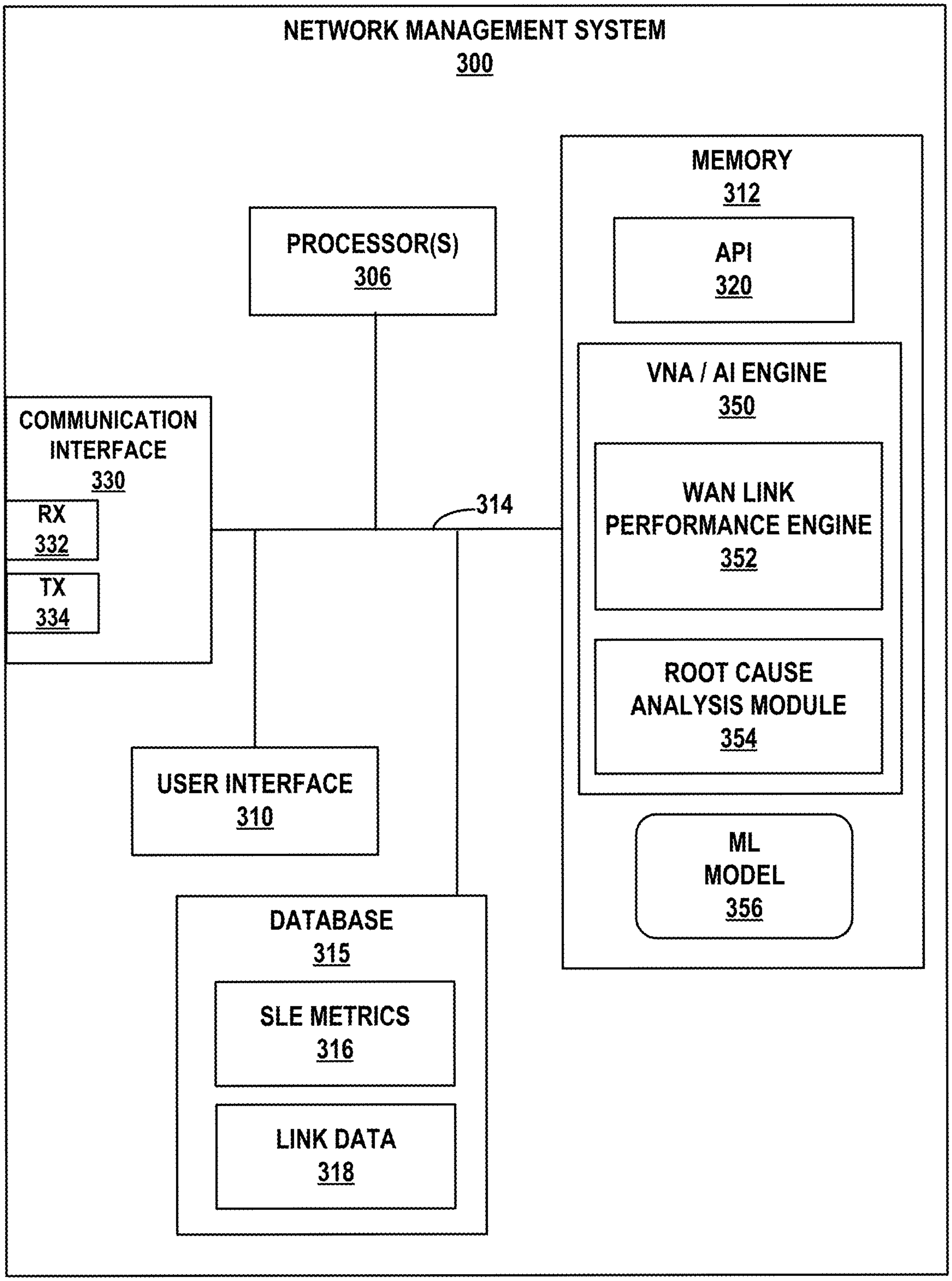
FIG. 3 shows an example network management system configured in accordance with one or more techniques of this disclosure.

FIG. 3 shows an example network management system (NMS) 300 configured in accordance with one or more techniques of this disclosure. NMS 300 may be used to implement, for example, NMS 130 in FIGS. 1A-1C. NMS 300 may be responsible for monitoring and management of one or more of network devices 110A-110I of FIG. 1A of networks 102, network devices 187A, 187B of FIGS. 1B-1C, or network device 200 of FIG. 2. NMS 300 may also be responsible for In this example, NMS 300 receives path data collected by network devices 110A-110N. The path data may comprise statistics and data samples at a logical path (e.g., peer path or tunnel) level, such as telemetry data and data extracted from messages and/or counters. In some examples, the path data may also include details about clients connected to the network devices 110. In further examples, the path data may include event-drive path data that is reported in response to the occurrence of certain events at network devices 110.

NMS 300 uses the path data to calculate one or more SLE metrics in order to monitor the health condition of the logical paths from network devices 110 over an underlying physical WAN, and detect network failures and performance degradation that may impact user experiences. In some examples, NMS 300 may be a server as part of a micro-services cloud infrastructure within or accessible by network system 100 of FIGS. 1A-1C.

In some examples, in addition to monitoring network devices 110, NMS 300 is also responsible for monitoring and management of one or more wireless or wired networks (e.g., wireless network 173 and wired LAN 175 of FIG. 1B), in addition to monitoring network devices of service providers or other networks. In this example, NMS 300 also receives data collected by access points from user equipment (e.g., user devices 171 of FIG. 1B) and analyzes this data for cloud-based management of the wireless networks. In this manner, a single NMS 300 can be used for management of both network devices 110, which may include virtualized network devices (e.g., software-based routers executing on a virtual machine or container), and wireless networks, for an end-to-end WAN assurance system viewable via a single cloud-based WAN assurance portal.

NMS 300 includes a communications interface 330, one or more processor(s) 306, a user interface device 310, a memory 312, and link data 318. The various elements are coupled together via a bus 314 over which the various elements may exchange data and information. Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein. User interface device 310 may be any suitable device for outputting data, such as a display device that outputs one or more user interfaces (e.g., one or more graphical user interfaces).

Communications interface 330 may include, for example, an Ethernet interface. Communications interface 330 couples NMS 300 to a network and/or the Internet, such as any of network(s) 102 as shown in FIG. 1A, and/or any wide area networks or local area networks. Communications interface 330 includes a receiver 332 and a transmitter 334 by which NMS 300 receives/transmits data and information to/from any of network devices 110 and/or any other devices or systems forming part of networks 102 or 104 such as shown in FIG. 1A. The data and information received by NMS 300 may include, for example, network performance data, SLE-related or event log data received from network devices 110 and used by NMS 300 to remotely monitor the performance of network devices 110 and networks 102. In some examples, NMS may further transmit data via communications interface 330 to any of network devices 110 to remotely manage networks 102.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, a virtual network assistant (VNA)/AI engine 350 including a WAN link performance engine 352 and a root cause analysis engine 370, and an ML model 356. NMS 300 may also include any other programmed modules, software engines and/or interfaces configured for remote monitoring and management of network devices 110, including remote monitoring and management of any of network devices 110. NMS 300 may also include any other programmed modules, software engines and/or interfaces configured for remote monitoring and management of wireless networks, including remote monitoring and management of any of access points.

VNA/AI engine 350 analyzes link data 318 received from network devices 110 as well as its own data to identify when undesired or abnormal states are encountered in one of networks 102. For example, VNA/AI engine 350 may use root cause analysis module 354 to identify the root cause of any undesired or abnormal states. In some examples, root cause analysis module 354 utilizes artificial intelligence-based techniques to help identify the root cause of any poor SLE metric(s) and/or poor network performance at one or more of networks 102. In addition, VNA/AI engine 350 may automatically invoke one or more corrective actions intended to address the identified root cause(s) of one or more poor SLE metrics and/or poor performance. Examples of corrective actions that may be automatically invoked by VNA/AI engine 350 may include, but are not limited to, invoking API 320 to reboot one or more network devices 110. The corrective actions may further include switching an application from a WAN link to a different path and/or interface, restarting a switch and/or a router, invoking download of new software to a network device, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel to address the network error.

VNA/AI engine 350 may, in some examples, construct, train, apply and retrain supervised and/or unsupervised ML model(s), such as ML model 356 to predict the maximum bandwidth of the WAN link based at least in part on one or more parameters related to the WAN link. ML model 346 may be an artificial neural network, such as a convolutional neural network (CNN) or a recurrent neural network (RNN), or any other model trained using machine learning to predict the maximum bandwidth of the WAN link based at least in part on one or more parameters related to the WAN link.

NMS 300 or another computing system may train ML model 356 using any suitable machine learning technique, such as supervised learning, unsupervised learning, semi-supervised training, reinforcement learning, and the like, to predict the maximum bandwidth of the WAN link based at least in part on one or more parameters related to the WAN link. In some examples, NMS 300 or another computing system may use training data that includes parameters associated with a plurality of different WAN links (of network 102 and/or of other networks) obtained over a previous period of time (e.g., over one or more previous years, over one or more previous month, etc.) to train ML model 356. For example, the training data may include as training examples, for each of the plurality of different WAN links, a set of corresponding inputs, such as a set of parameters related to the corresponding WAN link, and a desired output, such as an associated maximum bandwidth of the corresponding WAN link, in order to train ML model 356 to predict, for a WAN link, a maximum bandwidth for the WAN link based on the set of parameters related to the WAN link.

The set of parameters related to a corresponding WAN link in the training data may include parameters of the corresponding WAN link under a variety of different network conditions, such as different WAN link usage levels, different times of the day, different days of the week, and/or any other relevant network conditions. Such parameters may include the maximum bandwidth of the WAN link in one or more low usage periods of the WAN link and/or one or more high usage periods of the WAN link, WAN link metrics of the WAN link in a variety of different WAN link usage periods, such as latency, jitter, and loss, application metrics in a variety of different WAN link usage periods such as retransmissions and round-trip time for TCP acknowledgements, interface bandwidth of one or more of network devices connected via the WAN link, the number of sessions and/or the duration of sessions during a variety of different WAN link usage periods, the amount of data received and/or transmitted by one or more of network devices during a variety of different WAN link usage periods, and/or any combination thereof.

VNA/AI engine 350 is configured to communicate with one or more of the pair of network devices 110 connected via the WAN link to schedule performance of the speed tests to obtain one or more parameters related to the WAN link based on the speed tests. In some examples, the one or more parameters related to the WAN link that is obtained from performance of a speed test of the WAN link may include one or more measurements of the bandwidth of the WAN link between the pair of network devices 110, such as one or more measurements of the rate of data transfer (e.g., in terms of megabits per second, gigabits per second, etc.) between the pair of network devices 110 across the WAN link. In some examples, the one or more parameters related to the WAN link that is obtained from performance of a speed test of the WAN link may also include one or more measurements of the bandwidth of an interface of one or more of the pair of network devices 110 connected via the WAN link.

In some examples, VNA/AI engine 350 may schedule performance of speed tests of a WAN link that connects a pair of network devices 110 across periods of different usage levels of the WAN link. VNA/AI engine 350 may schedule speed tests of the WAN link that are to be performed during periods of low usage of the WAN link, which may be periods of time during which there is no traffic or a relatively low amount of traffic in the WAN link, as well as speed tests of the WAN link that are to be performed during periods of high usage of the WAN link, which may be periods of time during which there is a relatively high amount of traffic in the WAN link.

VNA/AI engine 350 may communicate with one or more of the pair of network devices 110 connected via the WAN link to determine periods of low usage of the WAN link and/or periods of high usage of the WAN link and to schedule the performance of speed tests of the WAN link during such periods. In some examples, VNA/AI engine 350 may specify, to one or more of the pair of network devices, one or more thresholds that are indicative of the WAN link being in a low usage period, such as a specified threshold on the amount of data received and/or transmitted by one or more of the pair of network devices 110, and VNA/AI engine 350 may determine that the WAN link is in a low usage period if the amount of data received and/or transmitted by one or more of the pair of network devices 110 is below the specified threshold. In some examples, VNA/AI engine 350 may specify, to one or more of the pair of network devices, one or more thresholds that are indicative of the WAN link being in a high usage period, such as a specified threshold on the amount of data received and/or transmitted by one or more of the pair of network devices 110, and VNA/AI engine 350 may determine that the WAN link is in a high usage period if the amount of data received and/or transmitted by one or more of the pair of network devices 110 is above the specified threshold In some examples, VNA/AI engine 350 may communicate with one or more of the pair of network devices to schedule speed tests of the WAN link during maintenance windows of one or more of the pair of network devices. A maintenance window of a network device may be a time period right after the network device has been upgraded and/or rebooted, such that there may be no traffic or a very low amount of traffic being received and/or transmitted via the WAN link by the network device. As such, VNA/AI engine 350 may communicate with the one or more of the pair of network devices connected via the WAN link to determine the occurrence of maintenance windows of one or more of the pair of network devices and to schedule speed tests of the WAN link during maintenance windows of one or more of the pair of network devices.

In some examples, VNA/AI engine 350 may communicate with one or more of the pair of network devices to schedule speed tests of the WAN link during different times of the day, which may be based at least in part on the occurrence of an event associated with the WAN link. For example, VNA/AI engine 350 may schedule speed tests of the WAN link based on the occurrence of network choke events at the WAN link. A network choke event may occur at the WAN link when the WAN link experiences a high volume of network traffic and becomes overloaded. For example, a network event may occur at the WAN link when the network traffic over the WAN link consumes almost all of the bandwidth of the WAN link, such as when the network traffic over the WAN link consumes 99% or more of the maximum bandwidth of the WAN link.

VNA/AI engine 350 may be able to detect occurrences of network choke events at the WAN link by monitoring the performance of the WAN link, such as by monitoring WAN link metrics such as latency jitter, and loss, application metrics such as retransmissions and round-trip time for TCP acknowledgements, metrics regarding correlation of degraded link performance with high bandwidth usage, metrics regarding long term link stability, and/or a quality of service (e.g., a mean opinion score) of the WAN link. For example, if VNA/AI engine 350 determines that the latency, jitter, and/or loss of the WAN link suddenly spikes above a specified threshold for a specified period of time, VNA/AI engine 350 may determine that a network choke event has occurred at the WAN link.

VNA/AI engine 350 may determine, based on the occurrences of network choke events at the WAN link, times of the day in which network choke events are likely to occur at the WAN link, and may schedule speed tests of the WAN link for a time of the day that is a specified amount of time (e.g., 1 hour) before the likely occurrence of a network choke event. For example, if VNA/AI engine 350 detects daily occurrences of a network choke event at 12:12 PM, VNA/AI engine 350 may determine that a network choke event is likely to occur each day at 12:12 PM. VNA/AI engine 350 may therefore schedule speed tests of the WAN link for a time of the day that is a specified amount of time before the likely occurrence of a network choke event. In the example where VNA/AI engine 350 determines that a network choke event is likely to occur each day at 12:12 PM, VNA/AI engine 350 may schedule a speed test of the WAN link each day at 11:12 AM, which is one hour prior to the likely occurrence of the network choke event.

Scheduling speed tests of the WAN link prior to the likely occurrence of a network choke event may enable VNA/AI engine 350 to obtain one or more parameters related to the WAN link that may enable ML model 356 to learn the behavior of the WAN link prior to the occurrence of network choke events, such as the available bandwidth of the WAN link prior to the occurrence of the network choke events. For example, ML model 356 may use such parameters obtained by performing speed tests of the WAN link prior to the occurrence of network choke events whether the network choke event is caused by the WAN link going down or whether the network choke events are caused by other issues in network 102.

VNA/AI engine 350 may, in this way, schedule the one or more of the pair of network devices 110 connected via the WAN link to obtain one or more parameters related to the WAN link based at least in part on a maintenance window of one or more of the pair of network devices, a low usage time associated with the WAN link, a high usage time associated with the WAN link, and/or a bandwidth of the WAN link measured at a given point in time exceeding a threshold.

As described above, VNA/AI engine 350 may obtain one or more parameters related to the WAN link based on the speed tests, such as by communicating with one or more of the pair of network devices 110 connected via the WAN link to invoke application, such as speed test agent 238 shown in FIG. 2, that is configured to cause one or more of the pair of network devices 110 to obtain the one or more parameters. The one or more parameters related to the WAN link may include measurements of the bandwidth of the WAN link and/or measurements of the interface bandwidth of one or more interfaces of one or more of the pair of network devices 110 connected to the WAN link during periods of high usage of the WAN link and/or during periods of low usage of the WAN link, which may be indicative of the behavior of the WAN link during periods of high usage and/or periods of low usage of the WAN link.

The one or more parameters related to the WAN link may include measurements of the bandwidth of the WAN link and/or measurements of the interface bandwidth of one or more interfaces of one or more of the pair of network devices 110 connected to the WAN link during maintenance windows of one or more of the pair of network devices 110, which may be indicative of the behavior of the WAN link during periods of high usage and/or periods of low usage of the WAN link. The one or more parameters related to the WAN link may include measurements of the bandwidth of the WAN link and/or measurements of the interface bandwidth of one or more interfaces of one or more of the pair of network devices 110 connected to the WAN link at specific times of the day, such as at times of the day prior to the occurrence of network choke events at the WAN link, which may be indicative of one or more issues with the WAN link that may occur at specific times of the day.

VNA/AI engine 350 may apply, to one or more parameters related to a WAN link between a pair of network devices 110 in networks 102, ML model 356 to predict a maximum bandwidth of the WAN link. That is, VNA/AI engine 350 may input, into ML model 356, the one or more parameters related to a WAN link obtained from the speed tests performed on the WAN link, and ML model 356 may predict, based on the one or more parameters related to the WAN link, the maximum bandwidth of the WAN link. VNA/AI engine 350 may store the predicted maximum bandwidth of the WAN link in database 315.

In some examples, NMS 300 may determine that a WAN link between a pair of network devices 110 is suffering from poor performance based on various metrics associated with the WAN link that NMS 300 may receive from, e.g., the pair of network devices 110. Such metrics may include WAN link metrics such as latency jitter, and loss, application metrics such as retransmissions and round-trip time for TCP acknowledgements, metrics regarding correlation of degraded link performance with high bandwidth usage, metrics regarding long term link stability, and/or a quality of service (e.g., a mean opinion score).

In some examples, root cause analysis module 354 may use the predicted maximum bandwidth of the WAN link to detect an issue (e.g., a fault) with the WAN link at a given point in time and/or to determine the root cause of the issue with the WAN link. For example, root cause analysis module 354 may detect a performance issue with the WAN link by measuring the bandwidth of the WAN link at the given point in time and comparing the measured bandwidth of the WAN link to the predicted maximum bandwidth of the WAN link. Root cause analysis module 354 may be able to measure, at a point in time, the bandwidth of the WAN link that connects a pair of network devices 110 based on an amount of data transmitted by a network device of the pair of network devices 110 for each communication session of a plurality of communication sessions for which the network device forwards network traffic, an amount of data received by the network device for each communication session of the plurality of communication sessions, a duration of each communication session of the plurality of communication sessions, a number of the plurality of communication sessions, a total bandwidth of an interface of the network device, and/or one or more of a measurement of jitter, packet loss, or latency of network data associated with communication session of the plurality of communication sessions. If root cause analysis module 354 determines that the measured bandwidth of the WAN link is smaller than the predicted maximum bandwidth of the WAN link by at least a predetermined amount, such as being 90% smaller than the predicted maximum bandwidth of the WAN link, being 95% smaller than the predicted maximum bandwidth of the WAN link, and the like, root cause analysis module 354 may determine that there is a performance issue associated with the WAN link and may determine that the root cause of the poor performance of the WAN link is due to link exhaustion.

VNA/AI engine 350 may, in response to root cause analysis module 354 determining a root cause of the poor performance of a WAN link, output a notification indicating the determined root cause of the poor performance of the WAN link. For example, if root cause analysis module 354 may determine that link exhaustion of the WAN link is the root cause of the poor performance of the WAN link, VNA/AI engine 350 may output a notification indicating that link exhaustion is the root cause of the poor performance of the WAN link.

In some examples, VNA/AI engine 350 may determine one or more remedial actions to address poor performance of the WAN link. A pair of network devices 110 may connect to each other via multiple WAN links on different interfaces of the pair of network devices 110. If VNA/AI engine 350 determines that a WAN link that connects a pair of network devices 110 is link exhausted, VNA/AI engine 350 may determine whether another WAN link that connects the pair of network devices 110 has available bandwidth to handle some of the network traffic of the link exhausted WAN link and, if so, may determine a remedial action of switching some of the network traffic from the link exhausted WAN link to another WAN link between the pair of network devices 110 that has available bandwidth to handle some of the network traffic of the link exhausted WAN link.

For example, VNA/AI engine 350 may measure, at a given point in time, the bandwidth of each of a plurality of WAN links that connect the pair of network devices 110 and may compare the measured bandwidth of each WAN link with the predicted maximum bandwidth of the corresponding WAN link. If the measured bandwidth of a WAN link is greater than a specified percentage of the predicted maximum bandwidth of the WAN link, such as being greater than 50%, greater than 70%, and the like of the predicted maximum bandwidth of the WAN link, VNA/AI engine 350 may determine that the WAN link is not link exhausted and has available bandwidth to take on additional network traffic.

VNA/AI engine 350 may determine, based on comparing the measured bandwidth of each of a plurality of WAN links that connect a pair of network devices 110 to a corresponding predicted maximum bandwidth, a remedial action to address poor performance of a WAN link that connect the pair of network devices 110. For example, a first network device of the pair of network devices 110 may connect, via a first interface, to a first WAN link to a second network device of the pair of network devices and may connect, via a second interface, to a second WAN link to the second network device. VNA/AI engine 350 may determine that the first WAN link has a measured bandwidth of 2% of the predicted maximum bandwidth and therefore is link exhausted, and may determine that the second WAN link has a measured bandwidth of 80% of the predicted maximum bandwidth and is therefore not link exhausted. VNA/AI engine 350 may therefore determine that the second WAN link has available bandwidth to handle some of the network traffic of the first WAN link and may determine a remedial action of avoiding forwarding network traffic using the first WAN link and/or switching network traffic from the first WAN link to the second WAN link to address the link exhaustion of the first WAN link.

In some examples, VNA/AI engine 350 may, in response to determining the remedial action of switching network traffic from the first WAN link to the second WAN link to address the link exhaustion of the first WAN link, output a notification (e.g., to the network administrator of network 102) with a recommendation to stop forwarding network traffic using the first WAN link and/or to switch some of the network traffic being transmitted via the first WAN link from the first WAN link to the second WAN link. In some examples, VNA/AI engine 350 may, in response to determining the remedial action of switching network traffic from the first WAN link to the second WAN link to address the link exhaustion of the first WAN link, automatically invoke the remedial action to switch some of the network traffic being transmitted via the first WAN link from the first WAN link to the second WAN link, such as by automatically switching one or more applications that are using the first WAN link to transmit data to using the second WAN link to transmit data.

Figure 4:
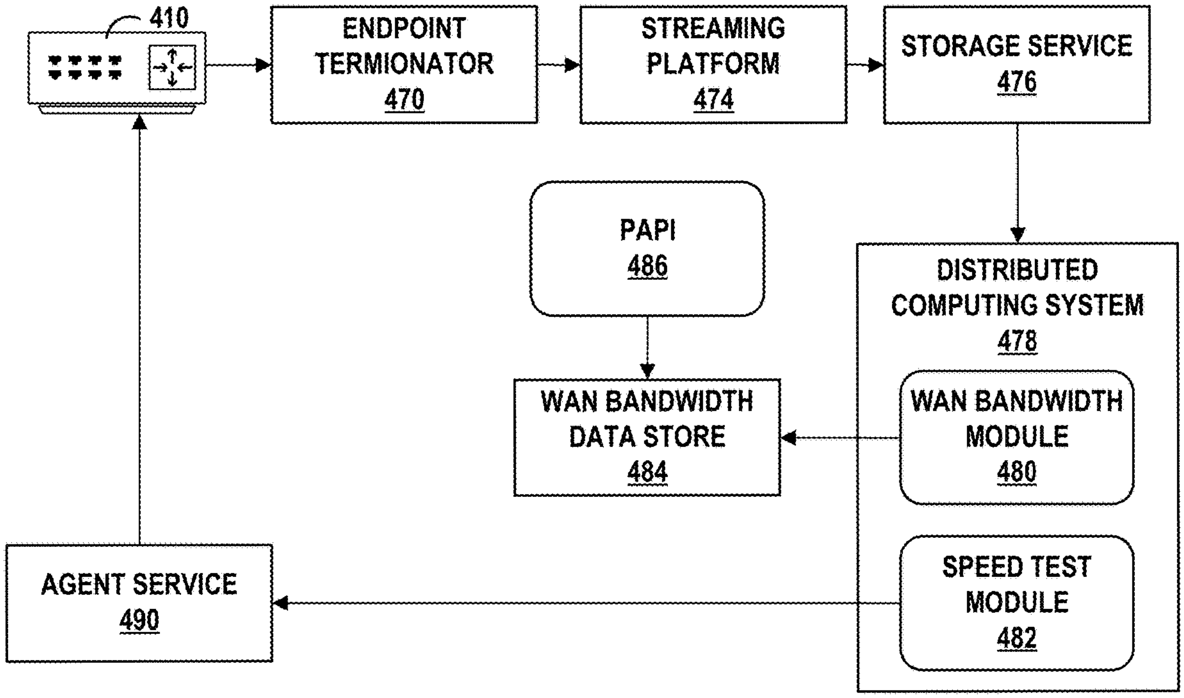
FIG. 4 is a block diagram illustrating an example implementation of an example network management system in accordance with techniques of this disclosure.

FIG. 4 is a block diagram illustrating an example implementation of NMS 130 in accordance with techniques of this disclosure. FIG. 4 is described in the context of FIGS. 1A-1C.

As shown in FIG. 4, distributed computing system 478, which is part of NMS 130, may communicate with network device 410, which is an example of any of network devices 110 shown in FIG. 1A, to perform speed tests of a WAN link between network device 410 and another network device to obtain one or more parameters of the WAN link and to predict a maximum bandwidth of the WAN link based on the obtained one or more parameters. An example of distributed computing system 478 is an Apache Spark-based computing system that may be able to perform distributed processing of the obtained one or more parameters to predict the maximum bandwidth of the WAN link.

Distributed computing system 478 may include WAN bandwidth module 480 that may execute to predict, based on the obtained one or more parameters related to the WAN link, the maximum bandwidth of the WAN link. Distributed computing system 478 may also include speed test module 482 that may execute to schedule speed tests of the WAN link to obtain the one or more parameters of the WAN link. For example, distributed computing system 478 may use agent service 490 to communicate with network device 410 to schedule and/or request performance of speed tests of the WAN link according to the techniques described throughout this application.

Endpoint terminator 470 may establish secure connectivity between network device 410 and NMS 130. Network device 410 may use endpoint terminator 470 to stream parameters obtained from performing speed tests of the WAN link via streaming platform 474, such as Apache Kafka, to storage service 476, which may be a cloud-based storage service, to store the obtained parameters for use by WAN bandwidth module 480 to predict, based on the parameters related to the WAN link, the maximum bandwidth of the WAN link.

Distributed computing system 478 may store the predicted maximum bandwidth of the WAN link in WAN bandwidth data store 480, which may be an in-memory data structure, such as Remote Dictionary Server (Redis). NMS 130 may use Protocol Application Programming Interface (PAPI) 486 to access the predicted maximum bandwidth of the WAN link stored in WAN bandwidth module 480.

Figure 5:
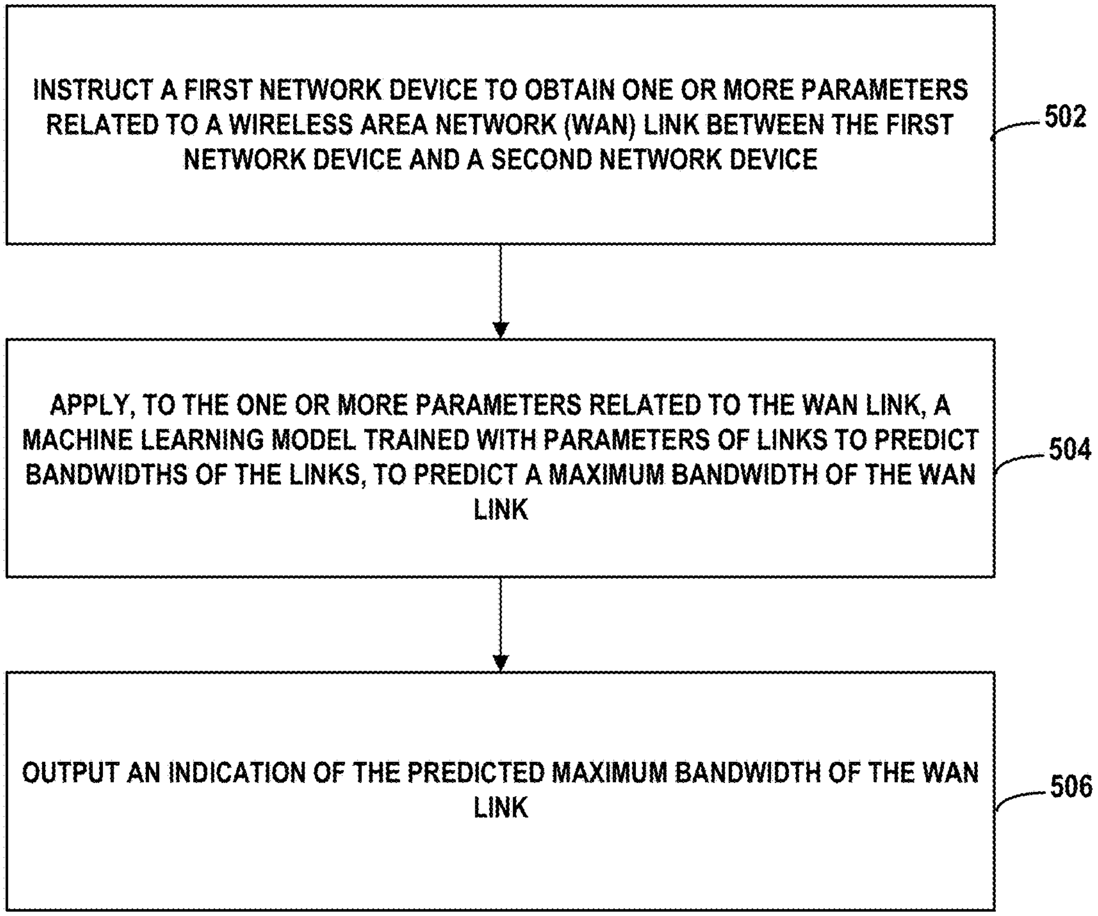
FIG. 5 is a flowchart illustrating example operations performed by an example network management system.

FIG. 5 is a flowchart illustrating example operations performed by an example network management system. FIG. 5 is described with respect to FIGS. 1-3.

As shown in FIG. 5, processor(s) 306 of network management system 300 may instruct a first network device (e.g., router 187A) to obtain one or more parameters related to a Wireless Area Network (WAN) link (e.g., logical path 189) between the first network device and a second network device (e.g., router 187B) (502). For example, 306 may schedule the first network device to obtain the one or more parameters related to the WAN link based at least in part on one or more of: a maintenance window of the first network device, a low usage time associated with the WAN link, a high usage time associated with the WAN link, or a bandwidth of the WAN link measured at a given point in time exceeding a predetermined threshold.

In some examples, the WAN link comprises a software-defined Wide Area Network (SD-WAN) link. In some examples, the network management system 300 is physically separate from the first network device and the second network device. In some examples, to instruct the first network device to obtain the one or more parameters related to the WAN link, processor(s) 306 may invoke an application (e.g., speed test agent 238), executed by the first network device, that is configured to cause the first network device to obtain the one or more parameters.

Processor(s) 306 may apply, to the one or more parameters related to the WAN link, a machine learning model 356 trained with parameters of links to predict bandwidths of the links, to predict a maximum bandwidth of the WAN link (504). In some examples, processor(s) 306 may train the machine learning model using training data that include, for each of the links, a corresponding set of parameters and an associated maximum bandwidth. In some examples, the corresponding set of parameters for a link includes measurements of a bandwidth of the link associated with different usage rates associated with the link, measurements of a bandwidth of an interface of a corresponding network device associated with the different usage rates associated with the link, measurements of the bandwidth of the link associated with a maintenance window of the corresponding network device, and measurements of the bandwidth of the link associated with different times of day. Processor(s) 306 may output an indication of the predicted maximum bandwidth of the WAN link (506).

In some examples, processor(s) 306 may compare a bandwidth of the WAN link measured at a given point in time against the predicted maximum bandwidth of the WAN link and may, in response to determining that the bandwidth of the WAN link measured at the given point in time is less than the predicted maximum bandwidth by a predetermined amount, determine an occurrence of a fault with the WAN link. In some examples, processor(s) 306 may determine the bandwidth of the WAN link measured at a given point in time based at least in part on one or more of: an amount of data transmitted by the first network device for each communication session of a plurality of communication sessions for which the first network device forwards network traffic, an amount of data received by the first network device for each communication session of the plurality of communication sessions, a duration of each communication session of the plurality of communication sessions, a number of the plurality of communication sessions, a total bandwidth of an interface of the first network device, and one or more of a measurement of jitter, packet loss, or latency of network data associated with communication session of the plurality of communication sessions.

In some examples, processor(s) 306 may output an indication of a fault with the WAN link based at least in part on the determination of the occurrence of the fault with the WAN link. In some examples, processor(s) 306 may perform a remedial action to cause the first network device to avoid forwarding network traffic via the WAN link based at least in part on the determination of the occurrence of the fault with the WAN link.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A network management system comprising:

one or more processors; and a memory comprising instructions executable by the one or more processors to cause the network management system to:

instruct a first network device to perform a plurality of speed tests for a Wireless Area Network (WAN) link between the first network device and a second network device during periods of different usage levels of the WAN link to obtain one or more parameters related to the WAN link between the first network device and the second network device;

apply, to the one or more parameters obtained from performance of the plurality of speed tests for the WAN link between the first network device and the second network device, a machine learning model trained with parameters of links to predict bandwidths of the links, to predict a maximum bandwidth of the WAN link; and output an indication of the predicted maximum bandwidth of the WAN link.

2. The network management system of claim 1, wherein the instructions further cause the network management system to:

compare a bandwidth of the WAN link measured at a given point in time against the predicted maximum bandwidth of the WAN link; and in response to determining that the bandwidth of the WAN link measured at the given point in time is less than the predicted maximum bandwidth by a predetermined amount, determine an occurrence of a fault with the WAN link.

3. The network management system of claim 2, wherein the instructions further cause the network management system to determine the bandwidth of the WAN link measured at a given point in time based at least in part on one or more of:

an amount of data transmitted by the first network device for each communication session of a plurality of communication sessions for which the first network device forwards network traffic;

an amount of data received by the first network device for each communication session of the plurality of communication sessions;

a duration of each communication session of the plurality of communication sessions;

a number of the plurality of communication sessions;

a total bandwidth of an interface of the first network device; and one or more of a measurement of jitter, packet loss, or latency of network data associated with communication session of the plurality of communication sessions.

4. The network management system of claim 2, wherein the instructions further cause the network management system to output an indication of a fault with the WAN link based at least in part on the determination of the occurrence of the fault with the WAN link.

5. The network management system of claim 2, wherein the instructions further cause the network management system to perform a remedial action to cause the first network device to avoid forwarding network traffic via the WAN link based at least in part on the determination of the occurrence of the fault with the WAN link.

6. The network management system of claim 1, wherein the instructions further cause the network management system to schedule the first network device to perform the plurality of speed tests to obtain the one or more parameters related to the WAN link based at least in part on one or more of:

a maintenance window of the first network device;

a low usage time associated with the WAN link;

a high usage time associated with the WAN link; or a bandwidth of the WAN link measured at a given point in time exceeding a predetermined threshold.

7. The network management system of claim 1, wherein the instructions further cause the network management system to train the machine learning model using training data that include, for each of the links, a corresponding set of parameters and an associated maximum bandwidth.

8. The network management system of claim 7, wherein the corresponding set of parameters for a link includes one or mor of:

measurements of a bandwidth of the link associated with different usage rates associated with the link;

measurements of a bandwidth of an interface of a corresponding network device associated with the different usage rates associated with the link;

measurements of the bandwidth of the link associated with a maintenance window of the corresponding network device; or measurements of the bandwidth of the link associated with different times of day.

9. The network management system of claim 1, wherein the WAN link comprises a software-defined Wide Area Network (SD-WAN) link.

10. The network management system of claim 1, wherein the network management system is physically separate from the first network device and the second network device, and wherein, to instruct the first network device to obtain the one or more parameters related to the WAN link, the the instructions further cause the network management system to invoke an application, executed by the first network device, that is configured to cause the first network device to obtain the one or more parameters.

11. A method comprising:

instructing, by one or more processors of a network management system, a first network device to perform a plurality of speed tests for a Wireless Area Network (WAN) link between the first network device and a second network device during periods of different usage levels of the WAN link to obtain one or more parameters related to the WAN link between the first network device and the second network device;

applying, by the one or more processors and to the one or more parameters obtained from performance of the plurality of speed tests for the WAN link between the first network device and the second network device, a machine learning model trained with parameters of links to predict bandwidths of the links, to predict a maximum bandwidth of the WAN link; and outputting, by the one or more processors, an indication of the predicted maximum bandwidth of the WAN link.

12. The method of claim 11, further comprising:

comparing, by the one or more processors, a bandwidth of the WAN link measured at a given point in time against the predicted maximum bandwidth of the WAN link; and in response to determining that the bandwidth of the WAN link measured at the given point in time is less than the predicted maximum bandwidth by a predetermined amount, determining, by the one or more processors, an occurrence of a fault with the WAN link.

13. The method of claim 12, wherein determining the bandwidth of the WAN link measured at the given point in time further comprises:

determining, by the one or more processors, the bandwidth of the WAN link measured at a given point in time based at least in part on one or more of:

an amount of data transmitted by the first network device for each communication session of a plurality of communication sessions for which the first network device forwards network traffic;

an amount of data received by the first network device for each communication session of the plurality of communication sessions;

a duration of each communication session of the plurality of communication sessions;

a number of the plurality of communication sessions;

a total bandwidth of an interface of the first network device; and one or more of a measurement of jitter, packet loss, or latency of network data associated with communication session of the plurality of communication sessions.

14. The method of claim 12, further comprising:

outputting, by the one or more processors, an indication of a fault with the WAN link based at least in part on the determination of the occurrence of the fault with the WAN link.

15. The method of claim 12, further comprising:

performing, by the one or more processors, a remedial action to cause the first network device to avoid forwarding network traffic via the WAN link based at least in part on the determination of the occurrence of the fault with the WAN link.

16. The method of claim 11, further comprising:

scheduling, by the one or more processors, the first network device to perform the plurality of speed tests to obtain the one or more parameters related to the WAN link based at least in part on one or more of:

a maintenance window of the first network device;

a low usage time associated with the WAN link;

a high usage time associated with the WAN link; or a bandwidth of the WAN link measured at a given point in time exceeding a predetermined threshold.

17. The method of claim 11, further comprising: training the machine learning model using training data that include, for each of the links, a corresponding set of parameters and an associated maximum bandwidth.

18. The method of claim 17, wherein the corresponding set of parameters for a link includes one or more of:

measurements of a bandwidth of the link associated with different usage rates associated with the link;

measurements of a bandwidth of an interface of a corresponding network device associated with the different usage rates associated with the link;

measurements of the bandwidth of the link associated with a maintenance window of the corresponding network device; or measurements of the bandwidth of the link associated with different times of day.

19. The method of claim 11, wherein the WAN link comprises a software-defined Wide Area Network (SD-WAN) link.

20. A non-transitory computer-readable storage medium comprising instructions executable by one or more processors to cause a network management system to:

instruct a first network device to perform a plurality of speed tests for a Wireless Area Network (WAN) link between the first network device and a second network device during periods of different usage levels of the WAN link to obtain one or more parameters related to the WAN link between the first network device and the second network device;

apply, to the one or more parameters obtained from performance of the plurality of speed tests for the WAN link between the first network device and the second network device, a machine learning model trained with parameters of links to predict bandwidths of the links, to predict a maximum bandwidth of the WAN link; and output an indication of the predicted maximum bandwidth of the WAN link.

* * * * *